Oct. 14, 1969  R. F. BURCHILL ET AL  3,472,126
PUSHBUTTON DECELERATOR CONTROL FOR ENGINE GOVERNORS
Original Filed July 21, 1966  2 Sheets-Sheet 1

INVENTORS
RICHARD F. BURCHILL
ROBERT H. MILLER

BY *Fryer, Tjensvold, Feix & Phillips*
ATTORNEYS

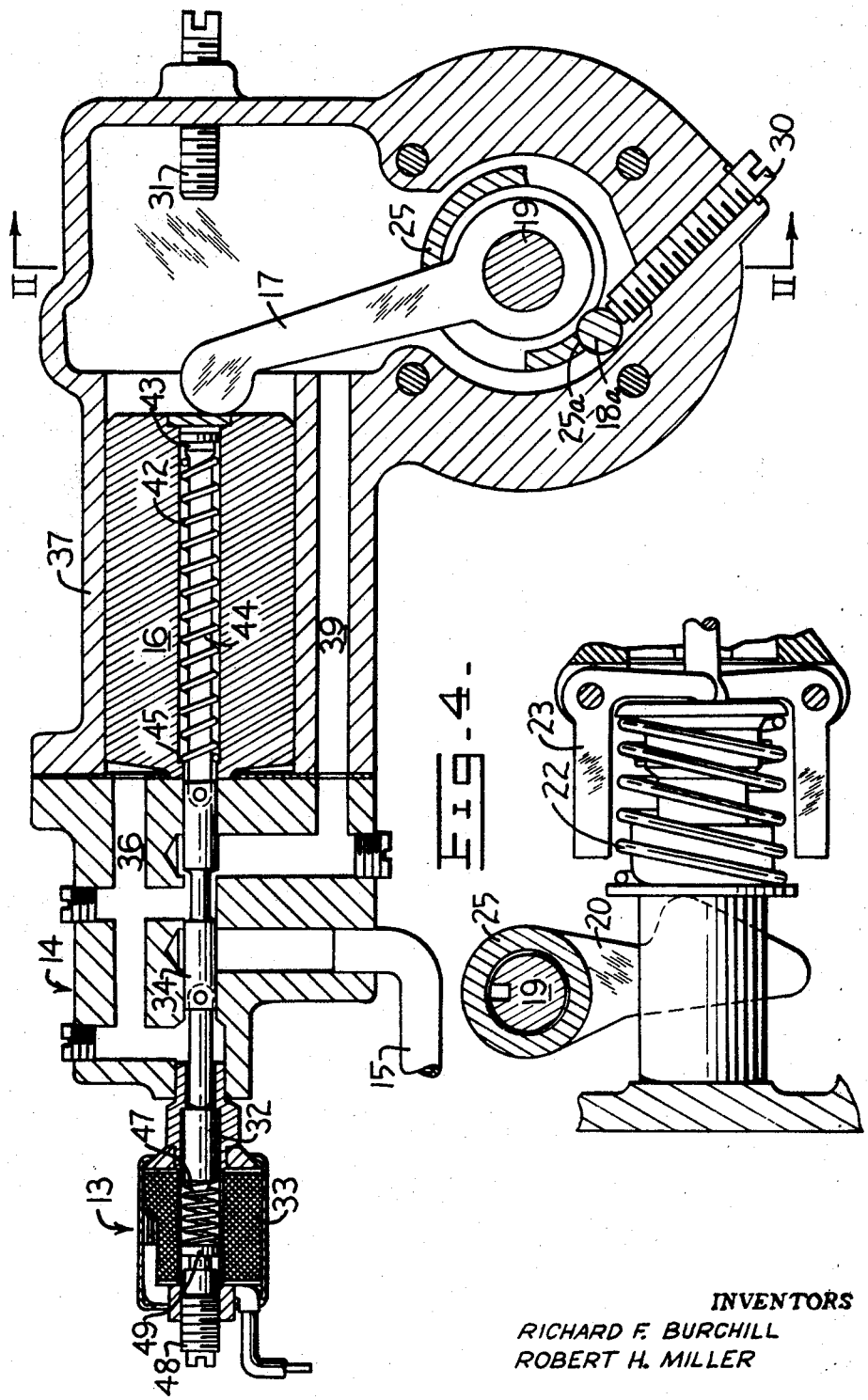

United States Patent Office 3,472,126
Patented Oct. 14, 1969

3,472,126
PUSHBUTTON DECELERATOR CONTROL FOR ENGINE GOVERNORS
Richard F. Burchill, East Peoria, and Robert H. Miller, Peoria, Ill., assignors to Caterpillar Tractor Co., Peoria, Ill., a corporation of California
Continuation of application Ser. No. 566,861, July 21, 1966. This application May 27, 1968, Ser. No. 742,996
Int. Cl. F15b *13/16, 13/044;* F16j *1/10*
U.S. Cl. 91—386                           4 Claims

ABSTRACT OF THE DISCLOSURE

An overriding control, for an engine with a governor, having a remotely operable valve for directing fluid to actuate a hydraulic motor which responds by actuating a lever to adjust the governor. A spring interacts between the motor and valve so that the degree of engine deceleration is proportional to force exerted to open the valve.

---

This application is a continuation of Ser. No. 566,861, filed July 21, 1966, now abandoned.

This invention relates to means for easily and quickly decelerating a vehicle engine through means other than the usual governor control lever.

In present day earthmoving equipment, the operator is so occupied with the control of various components and accessories, as well as directing the course of the vehicle, that quick deceleration with ordinary controls often becomes impossible. Pedal actuated decelerators are in use but in many vehicles, such as track type tractors with pedal actuated steering clutches, the operator's feet may be as busily occupied as his hands.

Since quick deceleration is highly desirable in many earthmoving and similar operations, it is the object of the present invention to provide a decelerating means operable by no more than the pressure of a finger and so constructed that a control element or so called push button might be located in any place convenient to the operator as, for example, adjacent the hand grip of a transmission shifting cane or the like. Further objects and advantages of the invention and the manner in which it is carried into practice are made apparent in the following specification wherein reference is made to the accompanying drawings.

Figure 1:
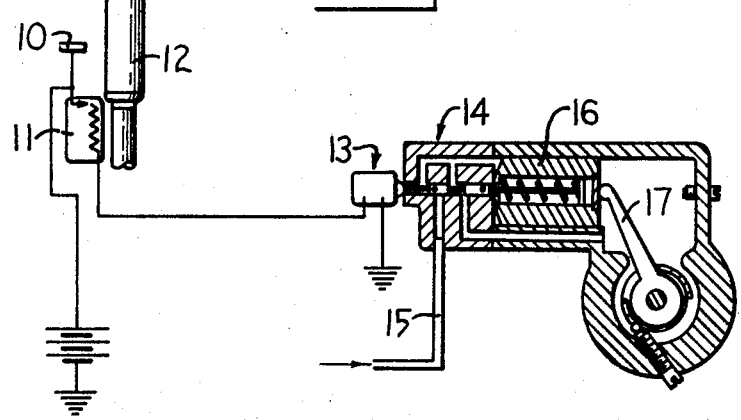
Figure 2:
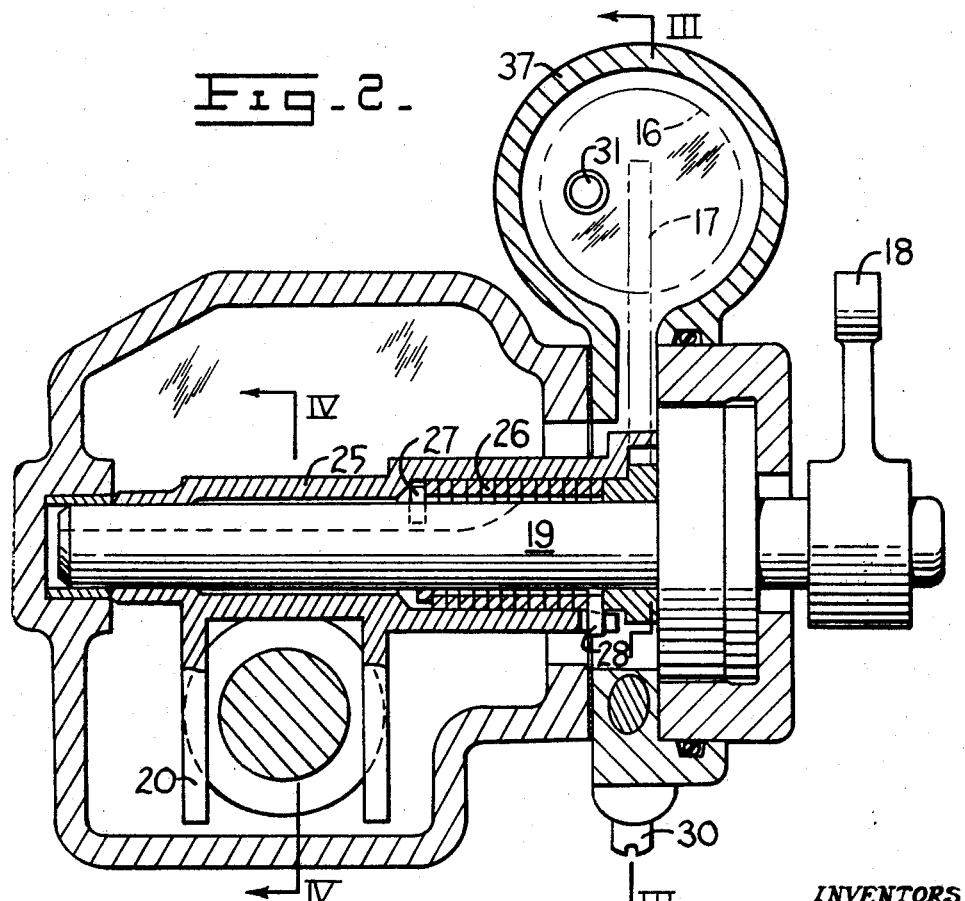

In the drawings:
FIG. 1 is a schematic view of a pushbutton control and mechanism to be associated with a governor for effecting rapid deceleration;
FIG. 2 is a sectional view taken through a typical governor and mechanism such as shown in FIG. 1, being a vertical section on the plane of the governor control shaft indicated by the line II—II of FIG. 3;
FIG. 3 is a sectional view taken on the line III—III of FIG. 2; and
FIG. 4 is a sectional view taken on the line IV—IV of FIG. 2.

Referring first to FIG. 1, a push button 10 for actuating a simple electrical switch for alternately a rheostat 11 in a housing, is mounted on the cane 12 of a transmission shifting lever or other similar control for ready access to a hand gripping the lever. Closing of the switch completes a circuit through a solenoid, generally indicated at 13, which actuates a valve, generally indicated at 14, for admitting pressurized fluid which may be from the engine lubricating system through a conduit 15 and to the head end of a piston 16 for moving the piston to the right and imparting clockwise movement to a lever 17 which overrides the governor control and permits deceleration in the manner presently to be described.

A conventional governor is shown in FIGS. 2, 3 and 4 as having a lever assembly 18 which actuates a shaft 19 for imparting movement to a bifurcated lever 20 (see FIGS. 2 and 4) to compress a governor spring 22 which, with flyweights 23, controls fuel supply and speed of an internal combustion engine in a conventional and well known manner. In order that the decelerator of the present engine, which is an overriding control, can cause retraction of the bifurcated lever 20 and permit expansion of the governor spring 22 without varying the position of the governor control lever assembly 18, the shaft 19 is connected only indirectly with a hollow shaft 25 by which the lever 20 is carried. Rotation of hollow shaft 25 is imparted by a preloaded coil spring 26 (see FIG. 2) keyed at one end to shaft 19 as at 27 and at the other end to shaft 25 as at 28. Rotation of shaft 19 by lever assembly 18 in a counterclockwise direction as viewed in FIG. 4, permits spring 26 to rotate shaft 25 in a like direction effecting compression of governor spring 22. Due to its preload condition, spring 26 having a force stronger than governor spring 22 will tend to rotate shaft 25 until a shoulder 25a rests against a dowel 18a of lever assembly 18. When decelerating lever 17 is moved under the influence of the hydraulic electric system briefly described above, it imparts movement directly to the hollow shaft 25 and since the movement to effect deceleration is clockwise, as viewed in FIG. 4, this rotation of shaft 25 is not obstructed by spring 26 which is free to contract. The driving connection between lever 17 and shaft 25 is shown in FIG. 3 wherein the lever is shown as engaging one end of a slot in the shaft where it is capable of moving the shaft from the high speed position shown, and established by an adjustable stop 30, to a low speed position established by contact of the piston 16 with an adjustable low idle stop 31. Thus temporary deceleration is effected without imparting movement to the control lever 18 and shaft 19 and upon termination of temporary deceleration the governor will return to the previously established operating position. The spring 26 will also serve to return the lever 17 to the normal position shown in FIG. 3. Thus, the arrangement of the spring 26, lever 17 and shaft 25 provides a lost motion connection. This connection permits the governor to be overridden by the lever 17 from a normal high speed setting established by the lever 18 and permits the governor to immediately return to the same high speed setting when the lever 17 is not being acted upon by the piston or motor 16.

The operation of the solenoid and hydraulic means for adjusting the governor is more clearly shown in FIG. 3 wherein the solenoid is shown as having an armature 32 adapted to be retracted upon energization of its coil represented at 33. This armature is connected to a spool 34 in the valve 14 and the porting is such that upon movement of the spool toward the left, fluid under pressure from line 15 is admitted to passage 36 and thus to the head end of the piston 16 in a cylindrical housing 37. This causes movement of the piston 16 toward the right and actuation of the lever 17 to effect deceleration in the manner previously described. Upon de-energization of the solenoid, spool 34 of the valve returns under influence of the spring, presently to be described, to the closed position shown in FIG. 3 which also opens a drain from the head end of the piston through passage 36 and to passage 39 which communicates with the interior of the governor housing and to the engine lube oil sump by conventional means not shown.

With the mechanism thus far described, deceleration is accomplished by moving the governor to its slowest operating position wherein the piston 16 comes to rest against the low idle stop 31. Modulated or partial deceleration can be obtained by utilizing a resistance such as shown at 11 in FIG. 1 so that the push button or plunger 10 can be employed to direct a variable current to the solenoid 13. Assuming a current of low value in solenoid 13, valve 34 will assume a partially open position and flow of oil to the head end of piston 16 will compress a spring 42 contained therein and seated between a spring seat 43 on a rod 44 and a shoulder 45 in the piston. The rod 44 is connected to valve spool 34 so that compression of spring 42 tends to close valve 34 and will close the valve when the spring force equals the electromagnetic force in the solenoid 33. In this manner, only partial movement of lever 17 and partial deceleration, depending in magnitude on the depression of control plunger 10, is obtained. The spring 42 has, as may be noted, no adjustment in the form of the invention disclosed but the solenoid 13 contains a spring 47 normally functioning to close the valve 34 at any time that the solenoid is not energized. Since this spring will produce a force auxiliary to that of the modulating spring 42, adjustment of its force will in effect vary the force of the modulating spring. To this end an adjusting screw 48 is provided to vary the position of a spring seat 49 at one end of the spring 47.

While the invention has been described as employing electromagnetic means between an operator's station and a hydraulic motor disposed adjacent a governor, cable or other mechanical means could be used for adjusting the position of the valve which controls the hydraulic motor.

What is claimed is:

1. A control associated with a governor having a normal relatively high speed setting for overriding the governor from its normal high speed setting, comprising
   lever means associated with the governor for establishing the governor setting,
   hydraulic motor means including a piston associated with said lever means, said motor means being operable to cause said lever means to override the governor,
   actuatable means,
   a source of fluid under pressure,
   valve means in communication with said source and said motor, said valve means being associated with said actuatable means for providing a variable flow of fluid under pressure to said motor in response to actuation of said actuatable means, and
   spring means interacting between said piston and said valve means with a tendency to oppose motion of said piston against said lever means and a simultaneous tendency to close said valve means wherein said valve means includes a reciprocable spool responsive to said actuable means for opening and closing said valve means, said spool being in generally concentric alignment with said piston to receive said spring for interaction therebetween.

2. The invention of claim 1 wherein said actuatable means is electrically actuatable for selectively variable operation of the motor means.

3. The invention of claim 2 further comprising switch means remotely located from the governor, said actuatable means being responsive to said switch means.

4. The invention of claim 1 further comprising means for varying the force of spring interaction between said piston and said valve means.

References Cited
UNITED STATES PATENTS

| | | | |
|---|---|---|---|
| 1,866,347 | 7/1932 | Crocker | 92—129 |
| 2,291,048 | 7/1942 | Lichtenstein | 91—387 |

PAUL E. MASLOUSKY, Primary Examiner

U.S. Cl. X.R.

91—387, 459; 92—129